(12) United States Patent
Gattus et al.

(10) Patent No.: US 8,436,243 B2
(45) Date of Patent: May 7, 2013

(54) ANTI-LIGHTNING SYSTEM AND AIRCRAFT COMPRISING SUCH A SYSTEM

(75) Inventors: Olivier Gattus, Gaure (FR); Charles Lambert, Toulouse (FR); Jacques Fournie, Grenade (FR); Jean-Christope Loche, Gratentour (FR); Mathieu Giraudineau, Nantos (FR); Gautier Destombes, Bouguenais (FR); Gilles Mercadier, Saint Sulpice sur Tarn (FR); Patrick Lieven, Fronton (FR); Damien Binaud, Couffouleux (FR)

(73) Assignee: Airbus Operations (S.A.S.), Toulouse (FR)

( * ) Notice: Subject to any disclaimer, the term of this patent is extended or adjusted under 35 U.S.C. 154(b) by 264 days.

(21) Appl. No.: 12/747,463

(22) PCT Filed: Dec. 10, 2008

(86) PCT No.: PCT/FR2008/052269
§ 371 (c)(1),
(2), (4) Date: Aug. 17, 2010

(87) PCT Pub. No.: WO2009/080991
PCT Pub. Date: Jul. 2, 2009

(65) Prior Publication Data
US 2011/0056718 A1    Mar. 10, 2011

(51) Int. Cl.
*H02G 13/00*    (2006.01)
(52) U.S. Cl.
USPC .......... 174/2; 174/3; 174/5 R; 174/6; 439/92; 439/98; 361/117; 361/220
(58) Field of Classification Search .............. 174/2, 3, 174/5 R, 6; 439/92, 98; 361/117, 220, 118
See application file for complete search history.

(56) References Cited

U.S. PATENT DOCUMENTS

| | | | |
|---|---|---|---|
| 5,841,066 A | 11/1998 | Bocherens | |
| 6,069,314 A * | 5/2000 | Varela | 174/3 |
| 7,554,785 B2 * | 6/2009 | Hawley | 361/218 |
| 7,678,997 B2 * | 3/2010 | Rawlings | 174/117 FF |
| 7,795,530 B2 * | 9/2010 | Schroer et al. | 174/2 |
| 7,960,647 B2 * | 6/2011 | Rizk et al. | 174/3 |
| 8,163,993 B2 * | 4/2012 | Gordin et al. | 174/6 |

FOREIGN PATENT DOCUMENTS

| | | |
|---|---|---|
| DE | 10200564 A1 | 7/2003 |
| EP | 0685389 A | 12/1995 |
| EP | 0790182 A | 8/1997 |
| EP | 1484245 A | 12/2004 |
| WO | 9951494 A | 10/1999 |

OTHER PUBLICATIONS

International Search Report dated Apr. 28, 2009.

* cited by examiner

*Primary Examiner* — Dhirubhai R Patel
(74) *Attorney, Agent, or Firm* — Greer, Burns & Crain, Ltd.

(57) ABSTRACT

An anti-lightning system for a composite structure having an external surface liable to be subjected to an air flow, the aforementioned system including at least one electrically conducting strip and fasteners fastening the aforementioned strip to the structure, the aforementioned strip being electrically connected to an electrical earth for removing current. According the disclosed embodiments, the aforementioned strip has a shape intended to collaborate with a housing created at the aforementioned external surface so that the external surface of the strip lies flush with the aforementioned external surface of the structure, and the aforementioned fasteners include an upper part flush with the external surface of the strip.

18 Claims, 4 Drawing Sheets

ANTI-LIGHTNING SYSTEM AND AIRCRAFT COMPRISING SUCH A SYSTEM

CROSS-REFERENCE TO RELATED APPLICATIONS

This application is the National Stage of International Application No. PCT/FR2008/052269 International Filing Date, 10 Dec. 2008, which designated the United States of America, and which International Application was published under PCT Article 21 (s) as WO Publication No. WO2009/080991 A1 and which claims priority from, and the benefit of, French Application No. 200759727 filed on 11 Dec. 2007, the disclosures of which are incorporated herein by reference in their entireties.

The aspects of the disclosed embodiments concern an anti-lightning system for protecting a composite structure, in particular panels comprising a light central core such as a honeycomb or foam core. It is especially suited to protecting an aircraft radome or the aircraft fairing comprised of panels made of composite structures. More precisely, the aspects of the disclosed embodiments concern an anti-lightning system comprising electrically conductive strips positioned on the external surface of these panels for attaching the lightning and allow the discharging of the currents due to lightning strikes on the external wall of the radome towards an aircraft ground.

BACKGROUND

The composite structures are widely utilized because of their high mechanical resistance together with a very low mass. These structures are therefore widely used by the aeronautics industry for equipping the aircraft's external wall such as the radome located at the front of the aircraft and the aircraft fairing. However, these structures which are electrically insulating do not make it possible to establish an evacuation of the electrical currents during lightning strikes on the external wall, locally generating an area of high-density charges that can, on the one hand, damage the aircraft's external wall and, on the other hand, perturb the electrical installations contained under this external wall. The case of the radome is even more critical since, by definition, it cannot integrate the standard lightning current discharge devices, such as a metal grid inserted in the structure's surface that, because of the requirements for transparency with regard to radar waves, are not allowed.

It is known to equip the external wall of aircraft with conducting elements extending along the wall to attach the lightning and allow the discharging of the currents due to lightning strikes on the external wall of the radome towards an aircraft ground, which is generally the fuselage.

FIGS. 1A and 1B show such a conducting element presented in the form of an electrically conductive strip 1 typically in aluminum or copper installed on the external surface 9 of the radome 3 of an airplane. The radome's main function is to protect a radar, consequently it is made of an electrically insulating composite material permeable to electromagnetic waves. The strip is fitted on the radome by fastener means 8 such as a screw. Each lightning conductor strip 1 is electrically linked to the external surface 9 of the radome 3 to allow the electrostatic charges that build up there to be discharged. The part 5 in which the screw is fitted to fasten the strip 1 is in insulating plastic.

This strip is electrically connected to the junction of the airplane's fuselage to ensure that it is grounded individually. Thus the conductive strip makes it possible to attach the lightning and establish the discharging of the currents due to lightning strikes on the external wall of the radome towards the ground without affecting any other element of the radome.

Such an anti-lightning system generally gives good results for external walls that do not have requirements in terms of aerodynamics. Nevertheless, it has been observed that the unevenness between the external surface 9 of the radome 3 and the conductive strip 1 that forms a step 20 are sources of discontinuity in the airflow 23 over the external surface of the aircraft, and as a result of turbulences 4 that lead to a reduction in the aircraft's aerodynamic performance (FIG. 1b).

However the generally conically-shaped radome located on the aircraft nose constitutes a main contribution to the aircraft's aerodynamics, thus it is essential to avoid these perturbations in order that the aircraft's aerodynamic performance is not penalized.

In effect, the consequence of these aerodynamic perturbations is to generate drag, increased by the triggering of the laminar/turbulent transition, and consequently a very noticeable rise in the airplane's consumption of fuel, which is incompatible with the economic requirements of the airlines.

It would therefore be beneficial to have a system protecting an airplane's radome against lightning allowing drag to be reduced so as to produce a significant saving in fuel weight.

SUMMARY

The objective of disclosed embodiments is therefore to propose an anti-lightning system for a composite structure, the external surface of which is subjected to an air flow, that is simple in its design and in its method of operation, making it possible to ensure an effective dissipation of the energy of a lightning impact without damaging the structure and without perturbation in the airflow.

For this, the disclosed embodiments concern an anti-lightning system for a composite structure having an external surface likely to be subjected to an airflow, said system comprising at least one electrically conductive strip and fasteners to fasten this strip to the structure, said strip being electrically connected to a ground permitting the currents to be evacuated.

According to the disclosed embodiments, said strip has a shape intended to match a recess created in the external surface such that the external surface of the strip is flush with the external surface of the structure and the fasteners comprise an upper part flush with the external surface of the strip.

In this manner, the anti-lightning system according to the disclosed embodiments makes it possible to ensure a perfect evenness between the external surface of the conductive strip and the external surface of the composite structure, thus making it possible to eliminate the turbulences and preserve the aircraft's aerodynamic performance.

"Evenness of the external surface of the conductive strip and the external surface of the structure" means that the external surface of the conductive strip is at the same level as the structure's external surface to close assembly tolerances. In particular, the external surface of the strip can jut out up to 0.2-0.3 mm, taking into account the acceptable tolerances with respect to aerodynamics.

In addition the anti-lightning system of the disclosed embodiments does not require a modification of the structure of the strip's electrical connection to the ground with respect to the state of the art by retaining the exterior strip technology.

Advantageously, said external surface of the composite structure with which the upper surface of the fasteners is flush is non-metallic.

This system can advantageously be implemented on any type of composite structure, whether monolithic, single sandwich or multiple sandwich.

The fasteners used to fit the strip on the structure comprise at least one fastener element having an upper part flush with the external surface of the strip and a lower part passing through the strip and the depth of the recess, and at least one holding element tightened on a lower part of the through fastener element on the internal surface of the structure so as to hold the strip in the recess. In this manner, the evenness between the external surface of the strip and the upper part of the fastener element also allows the risks of aerodynamic perturbations to be reduced as much as possible.

According to an embodiment of the disclosed embodiments, these fasteners to fasten said electrically conductive strip are arranged in the form of a strip.

Preferably, these fasteners are aligned and regularly spaced or not so as to closely follow the narrow shape of the electrically conductive strip, thus making it possible to limit the surface area of elements likely to form a radio barrier with regard to radar waves for a radome equipped with such an anti-lightning system.

Preferably, said holding element is made from an insulating material such as a Delrin resin or equivalent provided with a hollow able to fully receive said lower part of the fastener element, which is generally a threaded metal rod. Thus this holding element makes it possible to ensure the conductive strip's electrical insulation from the radar antenna located inside the radome.

In different particular embodiments of this anti-lightning system, each having its specific advantages and capable of numerous possible technical combinations:

the system comprises a composite member inserted in the depth of the structure and forming an integral part of the composite structure, said member having a hollow profile intended to match the shape of the electrically conductive strip.

"Integral part" means a composite member whose presence in the composite structure does not penalize the radome's radio performance and makes it possible to preserve the mechanical performance equivalent to a standard panel used for exterior strip technologies.

This composite member, which is a female strip imprint, is inserted between the layers of the composite structure during layup and cured together with the latter. Its installation is carried out in a mold equipped with a male strip imprint after layup of the composite structure's first skin.

In addition this member made of composite material also takes part in electrically insulating the anti-lightning strip with regard to the antenna contained inside the radome:

the composite member can be a strip of high-density semi-rigid foam the composite member can be a strip of high-density honeycomb the member can also be a strip made of a monolithic composite structure.

Advantageously, it is possible to select the material of the composite member to suit the material of the composite structure so as to preserve the integrity of the structure.

Alternatively, the anti-lightning system does not comprise a profiled composite member. The recess is formed directly by a groove located on the external surface of the composite structure. This groove is obtained by a layup of the composite structure's layers via a male imprint. The anti-lightning strip is thus profiled to the shape of this groove.

Preferably, the anti-lightning system comprises retaining layers made from an insulating material installed between the edges of the conductive strip and the edges of the recess to adapt the profile of the strip's external surface to the recess in order to obtain a perfect evenness between the external surface of the strip and the external surface of the structure.

The disclosed embodiments also concern a panel comprising at least one monolithic composite structure equipped with an anti-lightning system as described above.

The structure is made of insulating material and comprises only the fasteners and the electrically conductive strip. Thus when the composite structure is hit by lightning, the current travels on the surface, without passing through this structure, until it meets the closest strip and the associated fasteners.

"Monolithic" means a set of layers associated or secured directly to each other, without interposition of a core in an alveolar material, as in the case of a composite sandwich structure.

In a particular embodiment, this monolithic composite panel comprises a first skin forming the external wall of the panel and a second skin forming the internal wall of the panel. The skins constituting the panel are, for example, made of composite materials.

The disclosed embodiments also concern a panel comprising a core and at least two walls arranged on either side of the core, this panel being equipped with an anti-lightning system as described above.

The core can be made of an alveolar material such as a honeycomb or foam material.

Advantageously, each of the strips is fastened in a recess installed in the external surface of this panel by at least two fasteners comprising a screw and a cap nut.

Clearly, other means of fastening the strip onto a composite structure exist, in particular it is possible to use inserts embedded in the composite structure. The insert is a hollow body intended to receive a fastener unit such as a bolt with a nut.

The disclosed embodiments also concern a radome equipped with at least one panel as described above. In this case, preferably, each of the strips is electrically connected to fastener elements made from an electrically conducting material located at the base of the radome, which are intended to fasten the radome to the aircraft fuselage. In this way, the currents due to lightning strikes are evacuated by the strips directly towards the fuselage.

Finally, the disclosed embodiments concern an aircraft equipped with at least one panel as described above.

More generally, the disclosed embodiments concern a method of fitting an anti-lightning system on a composite structure having an external surface intended to be subjected to an airflow, said system comprising at least one electrically conductive strip and fasteners to fasten this strip to said structure.

According to the disclosed embodiments, the method comprises the following steps:

at least one recess is realized in the external surface of the composite structure, the electrically conductive strip is placed in each of the recesses, the shape of the strip being intended to match the shape of the recess such that the external surface of the strip is flush with the external surface of the structure, the strip is then fastened to the structure, the upper part of the fasteners being flush with the external surface of the structure.

In order to produce the recess, a composite member is inserted in the depth of the composite structure, the member having a hollow profile intended to match the shape of the strip.

In another particular embodiment, a groove is formed directly in the external surface of the composite structure in which the strip is to be placed.

BRIEF DESCRIPTION OF THE DRAWINGS

The disclosed embodiments will be better understood after reading the following description and examination of the figures included in an appendix, in which.

DETAILED DESCRIPTION

Figure 1A:
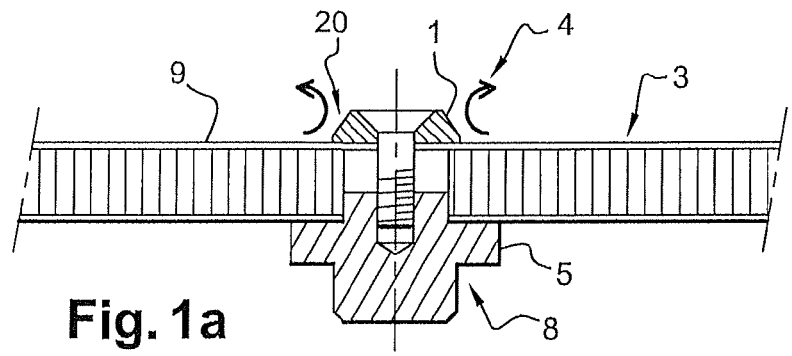
FIG. 1A shows a cross-section view of a radome equipped with an anti-lightning system according to the prior state of the art and FIG. 1B a top view of this radome and the airflow over this external surface.
Figure 1B:
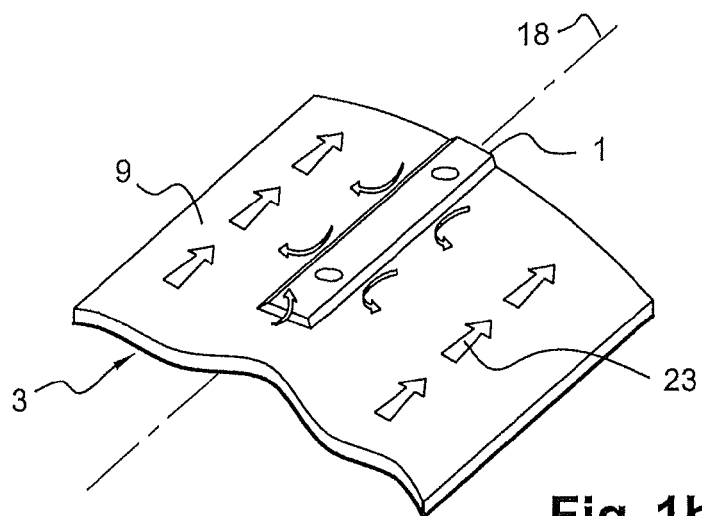
Figure 2:
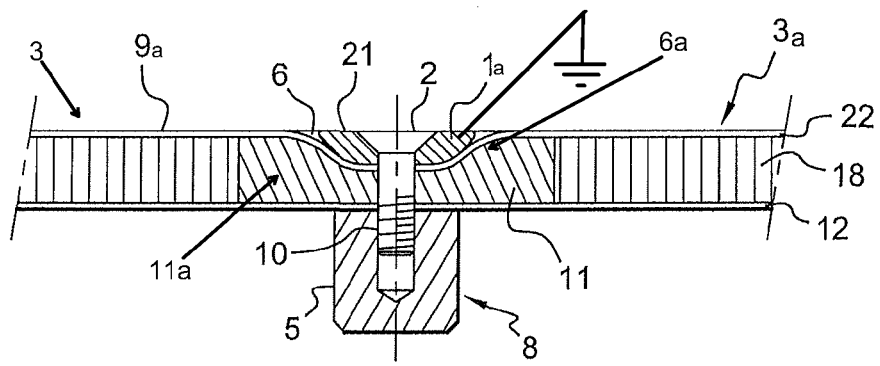
FIG. 2 represents, schematically and in cross-section, a panel equipped with an anti-lightning system according to a particular embodiment of the disclosed embodiments, the anti-lightning system comprising a composite member made of foam, the member having a hollow profile matching the shape of the anti-lightning conductive strip.

FIG. 2 shows a panel 3a equipped with an anti-lightning system according to a first embodiment of the disclosed embodiments. The panel 3a comprises a composite sandwich structure comprising a core 18 and two walls 22, 12 arranged respectively on either side of the core on the external surfaces of the core.

These walls 22, 12 form the external skins of the composite panel, generally made of high-resistant fibers such as glass, quartz, aramid or basalt fibers. The core 18 can be made from a foam, honeycomb or yarn material. The skins are secured to the core via polymerization of a resin.

An airplane's radome 3 is generally equipped with such a panel 3a made of an electrically insulating composite sandwich structure permeable to electromagnetic waves. The upper wall 22 of the panel 3a forming the external wall of the radome 3 is subjected to an airflow during flight.

Figure 8:
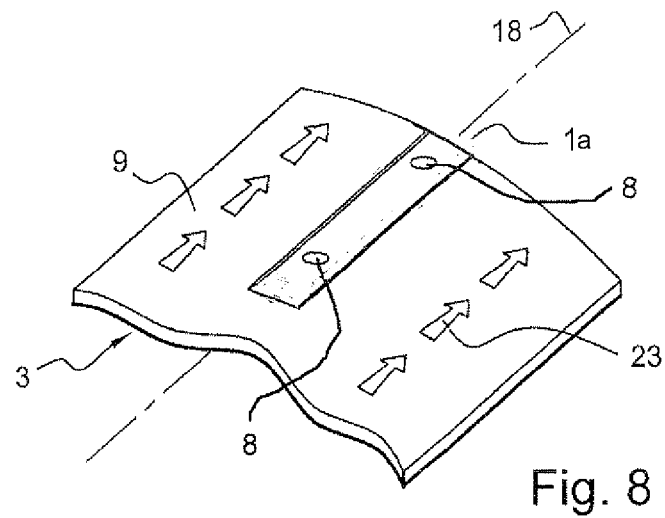
FIG. 8 shows a top view of a radome and the airflow over this external surface equipped with an anti-lightning system according to a particular embodiment of the disclosed embodiments.

The panel 3a is equipped with an anti-lightning system comprising an electrically conductive strip 1a fastened to the panel via fasteners 8. Generally, this strip 1a extends along the external wall 22 of the panel 3a on a longitudinal axis 19 from one end of the panel to another end (FIG. 8). For a large surface area, the panel 3a can also be provided with a plurality of strips 1a installed at regular intervals, wherein the number and sizing of the strip are therefore advantageously provided so as to allow the discharging of the currents due to lightning strikes towards the ground. The cross-section of these electrically conductive strips 1a is conditional on two criteria, namely the choice of material used and the impact of the presence of these strips on radio performance. Purely for purposes of illustration, a minimum requirement of the state of the art permitting an effective evacuation of the lightning current in the strip is 20 mm$^2$ for copper strips and 30 mm$^2$ for aluminum strips.

The anti-lightning strip 1a shown in FIGS. 2 to 6 and 8 to 9 presents a substantially semi-circular cross-section, the circular part being in contact with the bottom of a recess 6. FIG. 7 presents another form of the anti-lightning strip 1b having a rectangular cross-section with a very small depth. The strip can have various geometrical shapes, with a rectangular, trapezoidal, triangular or other cross-section.

The conductive strip 1a shown in FIG. 2 is placed in the recess 6 made at in the external surface 9 of the panel intended to be subjected to the airflow, the shape of the strip 1a being intended to match the shape of the recess 6 such that the external surface 21 of the strip 1a is flush with the external surface 9a of the panel 3a. In this way the assembly realizes an aerodynamic continuity allowing aerodynamic turbulences to be eliminated.

This anti-lightning strip 1a forms both a lightning receiver and a conductor of currents towards the ground.

FIG. 2 shows a particular embodiment of the fitting of the strip 1a, which is fastened in the recess 6 by fasteners 8 each comprising a fastener element having a lower part 10 passing through the strip 1a and the depth of the recess 6 and the part 5 comprising a holding element tightened on the lower part 10 of the through fastener element 8 on the internal surface 12 of the panel 3a.

Advantageously, the fastening is carried out such that an upper part 2 of this fastener element 8 is flush with the external surface 21 of the strip 1a so as not to create a discontinuity in order to avoid generating turbulences.

The lower part 10 of the fastener element 8 is generally a metal rod equipped over at least one portion of its external surface with an external threading that in part passes through a drilled hole in the conductive strip 1a and a through hollow realized in the depth of the panel 3a.

In order to avoid any perturbation from the strip 1a on the radar antenna, the holding element 5, a cap nut that has to entirely cover the lower through part of the rod 10, is preferably made from an insulating material such as a Delrin® resin or equivalent to form a shielding to the electrical field created by the circulation of currents in the strip so that there is no electrical arc attachment on the antenna.

The fastener elements 8 are preferably placed along the strip 1a on the axis 19 that extends from one end of the panel 3a to the opposite end (see FIG. 8).

Figure 9:
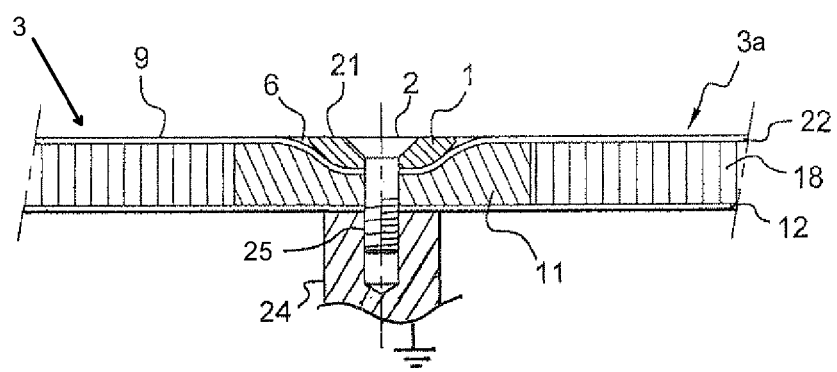
FIG. 9 represents, schematically and in cross-section, a panel equipped with an anti-lightning system according to a particular embodiment of the disclosed embodiments, the anti-lightning system comprising a composite member made of foam, the member having a hollow profile matching the shape of the anti-lightning conductive strip.

Each of the strips 1a is electrically and individually connected to fastener elements 25 made from an electrically conducting material located at the base of the radome 3, which are intended to fasten the radome to the aircraft fuselage 24 as shown in FIG. 9.

For forming the recess 6, FIG. 2 also shows that the anti-lightning system comprises a member 11 made in an insulating composite material having a hollow profile 6a intended to match the shape of the anti-lightning conductive strip 1a. This profiled composite member 11 is inserted in the depth of the panel 3a and forms an integral part of the composite structure of the panel. This member 11, which is a female strip imprint, is inserted between the layers of the composite structure during layup and cured together with the latter. Its installation is carried out in a mold equipped with a male strip imprint after layup of the first skin forming the interior surface 12 of the composite structure. In this way, its presence does not modify the composite structure, and influences as little as possible the radome's radio performance. In addition this member 11 made of composite material also makes it possible to ensure the electrical insulation of the anti-lightning strip 1a with regard to the antenna contained inside the radome 3. It also makes it possible to preserve the mechanical performance equivalent to a standard panel made from a composite sandwich structure.

Another advantage is to be able to provide a profiled composite member 11 that allows an interface to be realized between the fasteners and the sandwich structure, thus allowing the linkage forces, which are local, to be spread over a larger volume of the composite sandwich structure.

FIGS. 2 to 6 present the different embodiments of this profiled composite member 11.

In FIG. 2, the profiled composite member 11 is a strip 11a of high-density semi-rigid foam, expanded, extruded or stamped in the shape of the conductive strip 1a. This strip 11a is inserted in the depth of the panel 3a, more precisely between the external skin 9 and the internal skin 12 of the panel during the layup of the panel.

Figure 3:
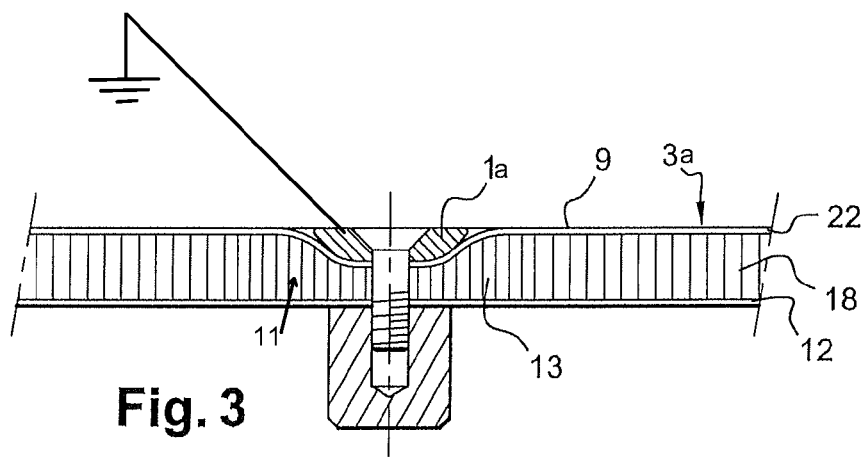
FIG. 3 represents the anti-lightning system according to the particular embodiment comprising a profiled composite member made of high-density honeycomb.

FIG. 3 shows another example of the profiled member 11, which is a strip 13 of high-density honeycomb. This strip 13 is machined in advance in the shape of the conductive strip 1a, then inserted in the depth of the panel 3a between the skins 12, 22.

Figure 4:
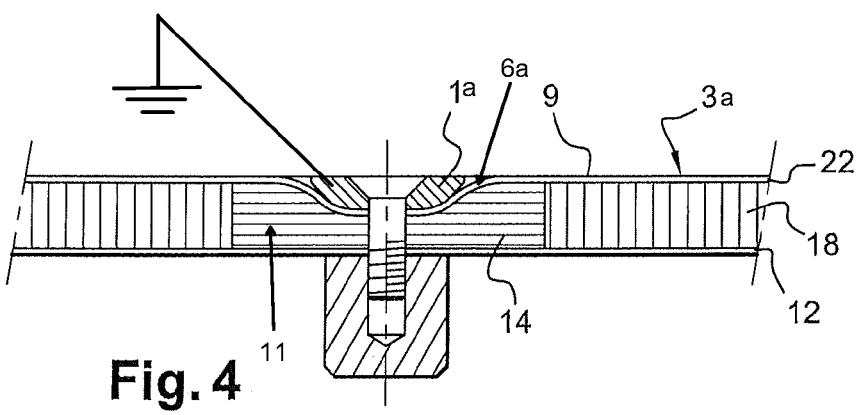
FIG. 4 represents the anti-lightning system according to the particular embodiment comprising a member made of monolithic composite material, the hollow profile of which is obtained by a layup of layers in the form of the strip by a successive stacking of layers of pre-impregnated fibers.

FIG. 4 shows another example of a profiled member 11 that is a monolithic strip 14, the hollow profile 6a of which is obtained by a layup in the form of the strip 1a by a successive stacking of layers of pre-impregnated fibers.

Figure 5:
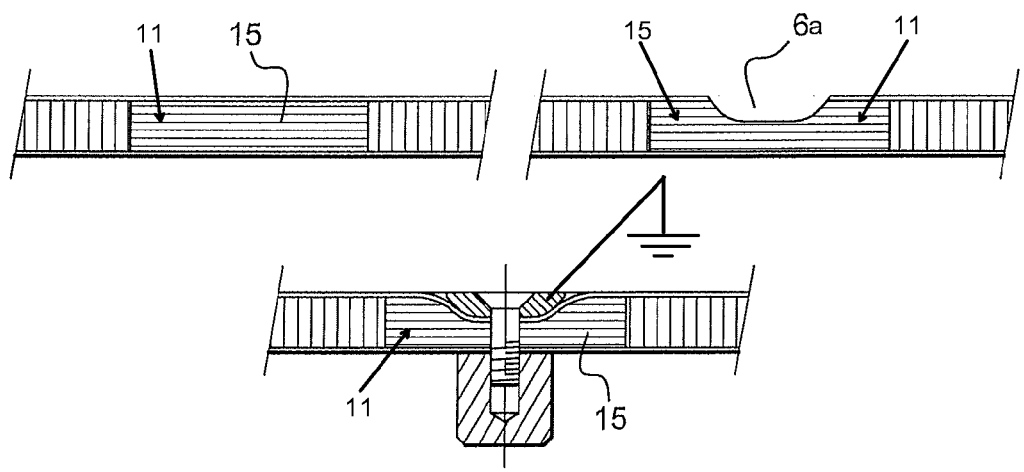
FIG. 5 schematically represents the anti-lightning system according to the particular embodiment of the disclosed embodiments comprising a monolithic composite member, the hollow profile of which is obtained by machining a solid monolithic member after polymerization.

FIG. 5 shows an example of a profiled member 11 that is a monolithic strip 15, but different from the example in FIG. 4 in that the hollow profile 6a is obtained by machining the solid monolithic member 15 after the polymerization of panel 3a.

Figure 6:
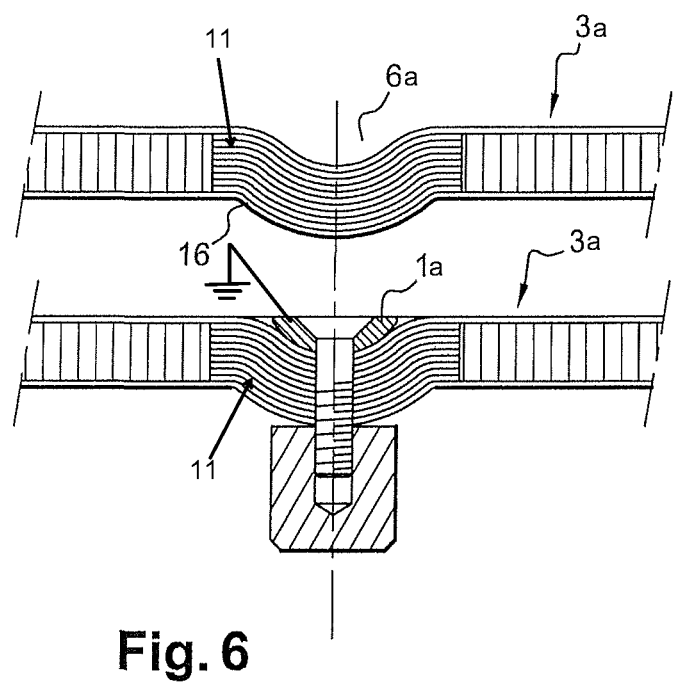
FIG. 6 schematically represents the anti-lightning system according to the particular embodiment of the disclosed embodiments comprising a monolithic member, the hollow profile of which is obtained by a layup in the contour of the conductive strip via a male imprint in the mold.
Figure 7:
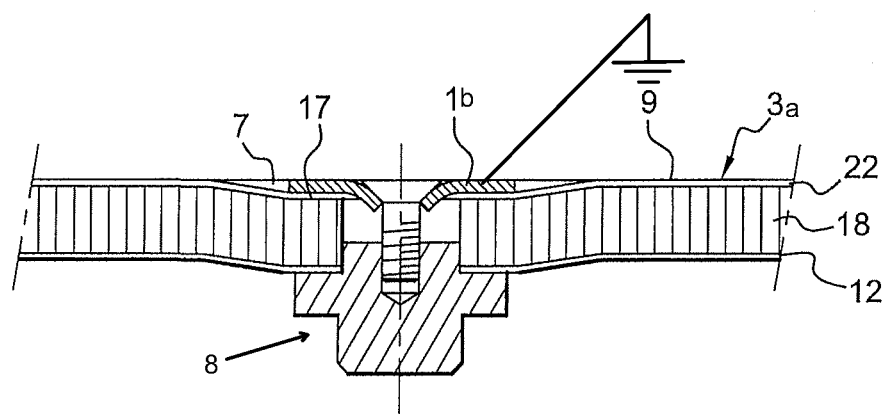
FIG. 7 schematically represents the anti-lightning system according to another particular embodiment of the disclosed embodiments not having a composite member, the recess for receiving the conductive strip being formed by a groove obtained by a layup via a male imprint of the layers of the panels.

FIG. 6 shows a last example of a profiled member 11 that is a monolithic strip 16 stacked in the contour of the strip 1a via a male imprint in the mold of the strip.

Whatever the type of profiled member 11, the means of fastening the strip 1a to the panel 3a are unchanged with respect to those presented in FIG. 2.

In another embodiment of the anti-lightning system as illustrated in FIG. 7, it does not comprise a profiled composite member 11. The recess is formed directly by a groove 17 located on the external surface 9 of the panel 3a. This groove 17 is obtained by a layup of the composite structure's layers via a male imprint. Generally, in order not to cause a significant modification in the structure of the panel 3a, this is a shallow groove 17 in which a thin anti-lightning strip 1b is received. Consequently, in order to preserve the effective cross-section for discharging currents, this requires an increase in the width. To ensure the fastening of such a conductive strip 1b, it is glued in advance on the external surface 9 in the groove 17. The securing of the strip 1b to the panel 3a is then completed by mechanical fasteners 8 already used for the other embodiments.

Advantageously, the anti-lightning system comprises retaining layers 7 made from an insulating material installed between the edges of the conductive strip 1a, 1b and the edges of the recess 6, 17 to adapt the profile of the external surface 21 of the strip 1a, 1b to the recess 6, 17 in order to obtain a perfect evenness between the external surface 21 of the strip 1a, 1b and the external surface 9a of the structure 3a.

The invention claimed is:

1. An anti-lightning system for a composite structure having an external surface likely to be subjected to an airflow, said system comprising at least one composite member inserted in a depth of the structure, said composite member forming an integral part of the composite structure, said composite member having a hollow profile with a concave shape open towards said external surface and at least one electrically conductive strip positioned in said hollow profile of said composite member and fasteners to fasten said strip to the structure, said strip being individually electrically connected by elements made of electrically conducting material to an aircraft fuselage ground permitting electrical currents to be evacuated, wherein said strip comprises a convex shape to substantially match the concave hollow profile of the composite member so that an external surface of the strip is flush with said external surface of the structure, and wherein said fasteners comprise an upper part flush with the external surface of the strip.

2. The system according to claim 1, wherein said external surface of the composite structure with which the upper surface of the fasteners is flush is non-metallic.

3. The system according to claim 1, wherein the fasteners to fasten said electrically conductive strip are arranged in the form of a strip.

4. The system according to claim 3, wherein the fasteners are aligned and regularly spaced.

5. The system according to claim 3, wherein the fasteners are not regularly spaced.

6. The system according to claim 1, wherein said composite member is a strip of high-density semi-rigid foam.

7. The system according to claim 1, wherein said composite member is a strip of high-density honeycomb.

8. The system according to claim 1, wherein said composite member is a strip made of a monolithic composite structure.

9. A panel comprising at least one monolithic composite structure equipped with an anti-lightning system according to claim 1.

10. A radome equipped with at least one panel according to claim 9.

11. An aircraft equipped with at least one panel according to claim 9.

12. A panel comprising a core and at least two walls arranged on either side of the core, said panel being equipped with an anti-lightning system according to claim 1.

13. An anti-lightning system for an electrically insulating composite panel having an external surface likely to be subjected to an airflow, said system comprising at least one electrically conductive strip and fasteners to fasten said strip to a depth of the panel, said strip and said fasteners being exposed at the external surface of the electrically insulating composite panel and individually electrically connected by elements made of an electrically conducting material to an aircraft fuselage ground permitting the currents to be evacuated, wherein said strip comprises a shape substantially matching a recess formed in said external surface so that an external surface of the strip is flush with said external surface of the panel, and wherein said fasteners comprise an upper part flush with the external surface of the strip, and further comprising layers of an insulating material installed between the edges of the conductive strip and edges of the recess to adapt the profile of the external surface of the strip to the recess to obtain an evenness between the external surface of the strip and the external surface of the structure.

14. The system according to claim 13, comprising a composite member inserted in the depth of the composite panel, said composite member forming an integral part of the composite panel, said composite member having a hollow profile intended to match the shape of the electrically conductive strip.

15. The system according to claim 14, wherein said composite member is a strip of high-density semi-rigid foam.

16. The system according to claim 14, wherein said composite member is a strip of high-density honeycomb.

17. The system according to claim 14, wherein said composite member is a strip made of a monolithic composite structure.

18. The system according to claim 13, wherein said recess is formed directly by a groove located on the external surface of the composite structure, said electrically conductive strip being profiled to the shape of said groove.

* * * * *